Patented Jan. 1, 1952

2,580,494

UNITED STATES PATENT OFFICE 2,580,494

N-DISUBSTITUTED-AMINO T-HYDROXY KETONES

Richard S. Wilder, Roslyn, and Daniel F. Herman, Philadelphia, Pa., assignors to Publicker Industries Inc., Philadelphia, Pa., a corporation of Pennsylvania No Drawing. Application April 10, 1947, Serial No. 740,727

20 Claims. (Cl. 260—247.7)

The present invention relates to new compositions of matter. More particularly it is concerned with novel N-disubstituted amino t-hydroxy ketones and to a process for the preparation thereof, such compositions being represented by the following structure:

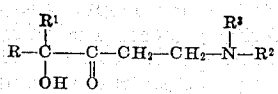

wherein R and $R^1$ are members of the group consisting of aliphatic groups containing one to three carbon atoms and may be connected to complete a cyclohexyl ring and wherein $R^2$ and $R^3$ are members of the group consisting of aliphatic groups containing one to three carbon atoms and may be combined to complete a cyclic radical of the group consisting of morpholine and piperidene rings.

In accordance with the present invention, it has been found that t-hydroxy methyl ketones can be reacted with formaldehyde and an amine or salts thereof to produce compounds of the type set forth in the foregoing structural formula. The fact that these compounds react to form the aforesaid N-disubstituted amino t-hydroxy ketones under the conditions herein set forth without major complicating side reactions is surprising, inasmuch as it is well known that tertiary alcohols dehydrate with ease, particularly when heated in the presence of an amine salt. Moreover, it is well established that the presence of a ketone group in the molecule greatly increases the ease of dehydration of a tertiary alcohol, especially where there is the possibility of forming a conjugated unsaturated system. Typical examples of this phenomenon are the dehydration of diacetone alcohol to mesityl oxide and of aldol to crotonaldehyde, even under the mildest dehydrating conditions. Moreover, 2-methyl-butan-2-ol-3-one is known to undergo dimerization and give undesirable condensation products in the presence of acidic catalysts. Because of these known facts, reactions of the type just cited might normally be expected to occur under the conditions employed in carrying out the present invention and, accordingly, it is believed to have been entirely unpredictable that the desired N-disubstituted amino t-hydroxy ketones would be produced in excellent yields.

The new compounds of the present invention are conveniently prepared in yields as high as 90% of the value theoretically obtainable by condensing a suitable t-hydroxy methyl ketone with formaldehyde in the presence of a secondary amine or a suitable acid salt thereof, at temperatures of from about 70 to 150° C. and preferably at from about 90 to 100° C., in the presence of agitation.

The proportion of reactants may be varied; however, it is generally preferable to employ approximately equimolecular quantities of t-hydroxy ketone, formaldehyde and amine salt. With a substantial excess of formaldehyde and amine salt over that theoretically required to react with the t-hydroxy ketone, i. e., of the order of 50% excess or more, it has been found that a second substituted aminomethyl group is introduced into the molecule. It has further been found that when the free amine is used in place of the amine salt, even in equimolecular quantities, the principal product is the di-aminomethyl derivative. Thus for example, using 2-methyl-butan-2-ol-3-one and a molar excess of formaldehyde and diethylamine salt, the predominating reaction found to occur is considered to be as follows:

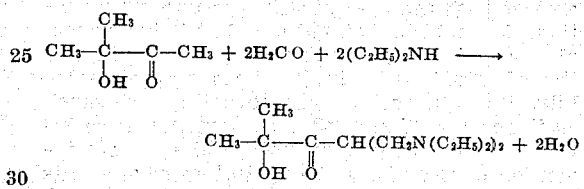

Inert solvents such as, for example, benzene, toluene, and the like may be utilized in carrying out the present invention if desired, but are, in the majority of instances, unnecessary for the satisfactory preparation of these new compounds. Such solvents are useful, however, in instances where it is desired to remove azeotropically the water of reaction from the mixture as it is formed or where it is found necessary or desirable to control the temperature of the reaction within a specified range. Also, on certain occasions where the reactants involved are highly reactive the presence of a suitable inert solvent is preferable in order to diminish the possibility of the occurrence of undesirable side reactions.

After the reaction is completed, as may be evidenced by a noticeable decrease in the odor of formaldehyde in the reaction mixture, the latter is subjected to distillation under reduced pressure and the N-disubstituted amino t-hydroxy ketone thus formed recovered. In the event the acid salt of the amine is used the reaction mixture, after the reaction has been completed, is poured into a volume of water generally, approximately equal to the volume of the reaction mass and the resulting mixture is saturated with a suitable alkaline salt, such as for example, potassium or sodium carbonates, whereby the free N-disubstituted amino t-hydroxy ketone is liberated and generally collects at the surface of the mixture, usually in the form of an oil. The products thus obtained may then be separated in accordance with known methods and further purified by any suitable means, such as for example, by fractional distillation under reduced pressure.

The t-hydroxy ketones suitable for use in preparing the new compositions of this invention may be selected from a wide range of compounds and it may generally be said that any t-hydroxy ketone is operative in the present invention wherein the tertiary hydroxyl group is adjacent to the carbonyl carbon atom. As examples of such compounds there may be mentioned 2-methylbutan-2-ol-3-one, 1-hydroxycyclohexyl methyl ketone, 3-(β-phenylethyl)butan-3-ol-2-one, 3-benzylbutan-3-ol-2-one, 1-hydroxycyclopentyl methyl ketone, 1-hydroxycamphoryl methyl ketone, 3-ethylpentan-3-ol-2-one, 3-methylpentan-3-ol-2-one, 3-phenylbutan-3-ol-2-one, 3,5-dimethylhexan-3-ol-2-one, and the like.

In carrying out the present invention the formaldehyde may be employed in the form of a 35 to 40% aqueous solution, as paraformaldehyde, or as trioxane. Secondary amines suitable for use in the present invention are those whose salts readily hydrolize in water and it is to be strictly understood that the expressions "secondary amine" or "secondary amine salts" appearing herein, are to be construed as referring only to amines having the aforesaid properties. As examples of such amines there may be mentioned diethylamine, dimethylamine, diisopropylamine, morpholine, piperidine, dibenzylamine, phenylbenzylamine, methyl aniline, or the acid salts (organic or inorganic) thereof, such as the formate, acetate, the mineral acid salts, and the like. In connection with the various classes of amines that are operative in the present invention, it should be pointed out that it has generally been found preferable to employ amines of the aforesaid types in the form of their salts. Likewise, it is to be understood that, inasmuch as it has been found that the reaction here involved is very general in nature, the present invention contemplates the utilization of any salts of the foregoing classes of amines having the above mentioned properties.

The present invention may be further illustrated by the following specific examples.

*Example I*

A mixture consisting of 132 parts of 2-methylbutan-2-ol-3-one, 142 parts of diethylamine hydrochloride, and 39.6 parts of paraformaldehyde is heated for five hours on a steam bath with agitation. At the end of this period the resulting viscous amber colored product is poured into 300 parts of water and the mixture saturated with potassium carbonate to salt out the free base, which is observed to rise to the top to form an upper layer. Distillation of this oil layer gives a good yield of 4-methyl-1-diethylaminopentan-4-ol-3-one, miscible with water in all proportions and having the following properties: B. P., 85–87° C./10 mm.; $n_D^{20}$, 1.4581; $d_4^{20}$, 0.980.

*Analysis.* — Calculated carbon content of 4-methyl-1-diethylaminopentan-4-ol-3-one, 64.18%; found, 64.05%. Calculated hydrogen content, 11.22%; found, 11.20%.

*Example II*

A mixture consisting of 163 parts of 3-methylpentan-3-ol-2-one, 142 parts of diethylamine hydrochloride, and 39.6 parts of paraformaldehyde is heated for a period of five hours on a steam bath with agitation. On completion of the reaction the product is isolated in accordance with the procedure described in Example I. Distillation gives a good yield of 4-methyl-1-diethylaminohexan-4-ol-3-one having the following physical properties: B. P., 85–89° C./8 mm.; $n_D^{20}$, 1.4590; $d_4^{20}$, 0.974.

*Analysis.* — Calculated carbon content of 4-methyl-1-diethylaminohexan-4-ol-3-one, 65.5%; found, 65.60%. Calculated hydrogen content, 11.43%; found, 11.45%.

*Example III*

A mixture consisting of 191 parts of 3,5-dimethylhexan-3-ol-2-one, 142 parts of diethylamine hydrochloride, and 39.6 parts of paraformaldehyde is subjected to the same reaction conditions as set forth in Examples I and II. On completion of the reaction the product is isolated and distilled to give a good yield of 4,6-dimethyl-1-diethylaminoheptan-4-ol-3-one having the following physical properties: B. P. 105–112° C./8 mm.; $n_D^{20}$, 1.4629; $d_4^{20}$, 0.947.

*Analysis.*—Calculated carbon content of 4,6-dimethyl-1-diethylaminoheptan-4-ol-3-one, 68.2%; found, 68.12%. Calculated hydrogen content, 11.78%; found, 11.40%.

*Example IV*

A mixture consisting of 44 grams of 3-ethylpentan-3-ol-2-one, 41.5 parts of diethylamine hydrochloride, and 11.3 parts of paraformaldehyde is heated with agitation for four hours at 80–90° C. At the end of this period the reaction mixture is diluted with 100 parts of water and the amine is liberated by saturating the resulting mixture with potassium carbonate. The resulting oily layer is separated from the reaction and fractionally distilled at 10 mm. vacuum. The 4-ethyl-1-diethylaminohexan-4-ol-3-one has the following physical properties: B. P. 80–83° C./10 mm.; $n_D^{20}$, 1.4562; $d_4^{20}$, 0.953.

*Example V*

A mixture consisting of 18 parts of 1-hydroxycyclohexyl methyl ketone, 15.4 parts of diethylamine hydrochloride and 3.3 parts of paraformaldehyde is heated with agitation on a steam bath for three and one-half hours. At the end of this period the reaction mixture is diluted with 50 parts of water and thereafter saturated with potassium carbonate. Distillation of the oil layer thus obtained yields 3-diethylamino-1-(1-hydroxycyclohexyl)-1-propanone having the following physical properties: B. P., 80–85°/10 mm.; $n_D^{20}$, 1.4817; $d_4^{20}$, 0.996.

*Example VI*

A mixture consisting of 27 parts of 2-methylbutan-2-ol-3-one, 10 parts of paraformaldehyde, and 29 parts of diisopropylamine hydrochloride is heated on a steam bath for a period of eight and one-half hours. At the end of this period the resulting mixture is diluted with 75 parts of water and thereafter saturated with potassium carbonate. The 4-methyl-1-diisopropylaminopentan-4-ol-3-one thus liberated on distillation boils at 80–87°/10 mm.

Example VII

A mixture consisting of 96 parts of morpholine, 36 parts of hydrogen chloride in the form of a 36% aqueous solution, 42.5 parts of formaldehyde in the form of a 37% aqueous solution and 102 parts of 2-methylbutan-2-ol-3-one is heated on a steam bath for six and one-half hours. At the end of this time, the product is diluted with 200 parts of water after which the mixture is saturated with potassium carbonate to liberate the free amino derivative in the form of an oil layer. Distillation of this layer gave a good yield of 4-methyl-1-morpholinopentan-4-ol-3-one having the following physical properties: B. P., 115-120° C./10 mm.; $n_D^{20}$, 1.4761; $d_4^{20}$, 1.056.

Example VIII

A mixture consisting of 102 parts of 2-methylbutan-2-ol-3-one, 33 parts paraformaldehyde and 80.3 parts of diethylamine is agitated and heated at about 90° C. for four hours. The reacted mixture is subjected to vacuum distillation and a small amount of 4-methyl-1-diethylaminopentan-4-ol-3-one obtained. However, the principal product is 3-methyl-1,1-di-(diethylaminomethyl)-butan-3-ol-2-one, boiling at 140 to 150° C. at 10 mm.

Example IX

A mixture consisting of 102 parts of 2-methylbutan-2-ol-3-one, 152 parts of 37% aqueous formaldehyde and 219 parts of diethylamine hydrochloride is agitated and heated at about 90° C. for four and one-half hours. The mixture is then diluted with an equal volume of water and saturated with potassium carbonate. The upper, organic liquid layer is separated and fractionally distilled under vacuum. The chief product is 3-methyl-1,1-di-(diethylaminomethyl)-butan-3-ol-2-one, boiling at 140-147° C. at 10 mm.

Because of the fact that the new N-disubstituted amino t-hydroxy ketones of our invention possess the unique combination of three reactive functional groups, these compounds may be utilized as intermediates for the preparation of a wide variety of valuable derivatives such as for example, coating compositions (as disclosed and covered by the claims of our copending application U. S. Serial No. 759,725, filed July 8, 1947, now Patent Number 2,540,153), pharmaceuticals, dyestuffs, and the like.

It is to be understood, of course, that the above examples are illustrative only and do not limit the scope of our invention. Other reactants of the classes previously defined could be substituted for those specifically employed in the examples and the reaction conditions could be modified in numerous respects without materially affecting the results. In general it may be said that the use of any equivalents or modifications of procedure, which would naturally occur to one skilled in the art, is included in the scope of our invention.

Our invention now having been described, what we claim is:

1. N-disubstituted amino-t-hydroxy ketones of the general formula

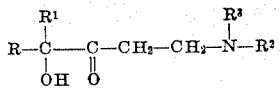

wherein R and $R^1$ are members of the group consisting of one to four carbon atom alkyl radicals and the one hydroxy cyclohexyl radical, and wherein $R^2$ and $R^3$ are members of the group consisting of alkyl groups containing one to three carbon atoms and may be combined to complete a cyclic radical of the group consisting of morpholine and piperidine rings.

2. 4 - methyl - 1 - diethylaminopentan-4-ol-3-one.

3. 4,6 - dimethyl - 1 - diethylaminoheptan - 4-ol-3-one.

4. 4 - methyl - 1 - diethylaminohexan - 4-ol-3-one.

5. 4-methyl-1-morpholinopentan-4-ol-3-one.

6. 3 - diethylamino-1-(1-hydroxycyclohexyl)-1-propanone.

7. A process for the synthesis of aminohydroxy ketones which comprises reacting a hydroxy methyl ketone having the formula

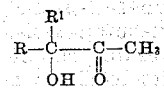

wherein R and $R^1$ are members of the group consisting of one to four carbon atom alkyl radicals and the one hydroxy cyclohexyl radical with formaldehyde and a secondary amine having the formula

wherein $R^2$ and $R^3$ are members of the group consisting of alkyl groups containing one to three carbon atoms and may be combined to complete a cyclic radical of the group consisting of morpholine and piperidene rings at a temperature not substantially above 150° C.

8. A process for the synthesis of aminohydroxy ketones which comprises reacting a hydroxy methyl ketone having the formula

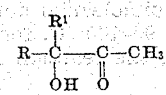

wherein R and $R^1$ are members of the group consisting of one to four carbon atom alkyl radicals and the one hydroxy cyclohexyl radical with substantially equimolecular amounts of formaldehyde and a salt of a secondary amine having the formula

wherein $R^2$ and $R^3$ are members of the group consisting of alkyl groups containing one to three carbon atoms and may be combined to complete a cyclic radical of the group consisting of morpholine and piperidene rings at a temperature not substantially above 150° C.

9. The process of claim 7 in which the reaction temperature is about 90–100° C.

10. The process of claim 8 in which the reaction temperature is about 90–100° C.

11. A process for the synthesis of 4-methyl-1-diethylaminopentan-4-ol-3-one which comprises reacting 2-methyl-butan-2-ol-3-one, formaldehyde, and diethylamine, in substantially equimolecular amounts at a temperature not substantially above 150° C.

12. A process for the synthesis of 4,6 dimethyl-1-diethylaminoheptan-4-ol-3-one which comprises reacting 3,5-dimethylhexan-3-ol-2-one, formaldehyde, and diethylamine, in substantially equimolecular amounts at a temperature not substantially above 150° C.

13. A process for the synthesis of 4-methyl-1-diethylaminohexan-4-ol-3-one which comprises reacting 3-methylpentan-3-ol-2-one, formaldehyde, and diethylamine, in substantially equimolecular amounts at a temperature not substantially above 150° C.

14. A process for the synthesis of 4-methyl-1-morpholinopentan-2-ol-3-one which comprises reacting 2-methylbutan-2-ol-3-one, formaldehyde, and a morpholine salt, in substantially equimolecular amounts at a temperature not substantially above 150° C.

15. A process for the synthesis of 3-diethylamino-1-(1-hydroxycyclohexyl) - 1 - propanone which comprises reacting 1-hydroxycyclohexyl methyl ketone, formaldehyde, and diethylamine, in substantially equimolecular amounts at a temperature not substantially above 150° C.

16. A process for the synthesis of 4-methyl-1-diethylaminopentan-4-ol-3-one which comprises reacting 2-methyl-butan-2-ol-3-one, formaldehyde, and a hydrolzable salt of diethylamine, in substantially equimolecular amounts at a temperature of about 90–100° C. for about 5 hours, thereafter pouring the reaction mixture into an excess of water, and thereafter salting out the free base.

17. A process for the synthesis of 4,6 dimethyl-1-diethylaminoheptan-4-ol-3-one which comprises reacting 3,5-dimethylhexan-3-ol-2-one, formaldehyde, and a hydrolyzable salt of diethylamine, in substantially equimolecular amounts at a temperature of about 90–100° C. for about 5 hours, thereafter pouring the reaction mixture into an excess of water, and thereafter salting out the free base.

18. A process for the synthesis of 4-methyl-1-diethylaminochexan-4-ol-3-one which comprises reacting 3-methylpentan-3-ol-2-one, formaldehyde, and a hydrolyzable salt of diethylamine, in substantially equimolecular amounts at a temperature of about 90–100° C. for about 5 hours, thereafter pouring the reaction mixture into an excess of water, and thereafter salting out the free base.

19. A process for the synthesis of 4-methyl-1-morpholinopentan-2-ol-3-one which comprises reacting 2-methylbutan-2-ol-3-one, formaldehyde, and a hydrolyzable salt of diethylamine, in substantially equimolecular amounts at a temperature of about 90–100° C. for about 6½ hours, thereafter pouring the reaction mixture into an excess of water, and thereafter salting out the free base.

20. A process for the synthesis of 3-diethylamino-1-(1-hydroxycyclohexyl) - 1 - propanone which comprises reacting 1-hydroxycyclohexyl methyl ketone, formaldehyde, and a hydrolyzable salt of diethylamine, in substantially equimolecular amounts at a temperature of about 90–100° C. for about 3½ hours, thereafter pouring the reaction mixture into an excess of water, and thereafter salting out the free base.

RICHARD S. WILDER.
DANIEL F. HERMAN.

REFERENCES CITED

The following references are of record in the file of this patent:

UNITED STATES PATENTS

| Number | Name | Date |
|---|---|---|
| 2,344,814 | Grum | Mar. 21, 1944 |

FOREIGN PATENTS

| Number | Country | Date |
|---|---|---|
| 479,939 | Great Britain | Feb. 15, 1938 |

OTHER REFERENCES

Adams et al.: "Organic Reactions," vol. 1, pp. 303–341 (John Wiley and Sons, Inc., 1944).

Spaeth et al.: "J. Org. Chem.," vol. 11, pp. 399–404 (1946).